Figure 1:
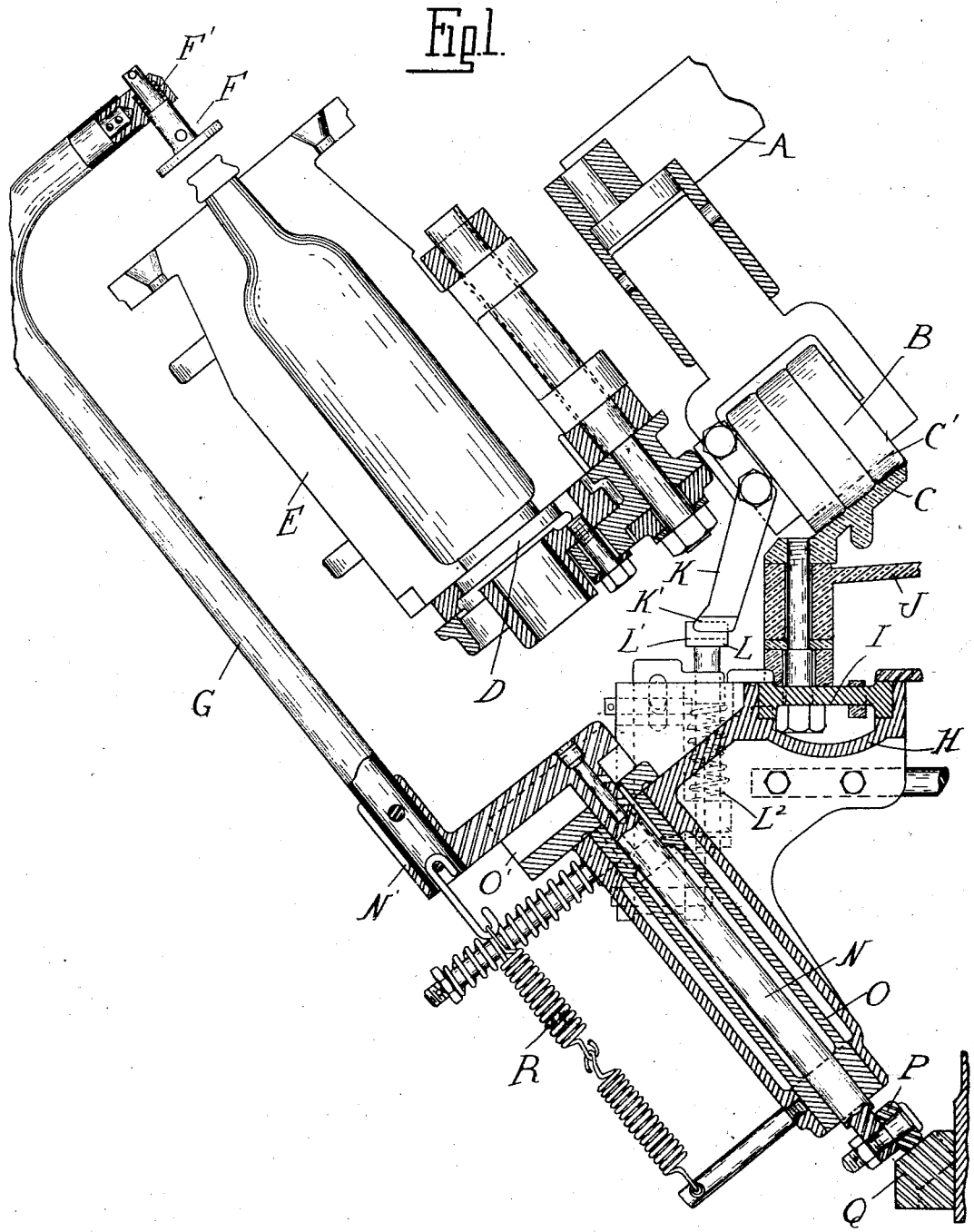

W. E. BOCK.
GLASS BLOWING MACHINE.
APPLICATION FILED FEB. 25, 1909.

1,063,108.

Patented May 27, 1913.

2 SHEETS—SHEET 1.

Witnesses
Inventor
William Emil Bock

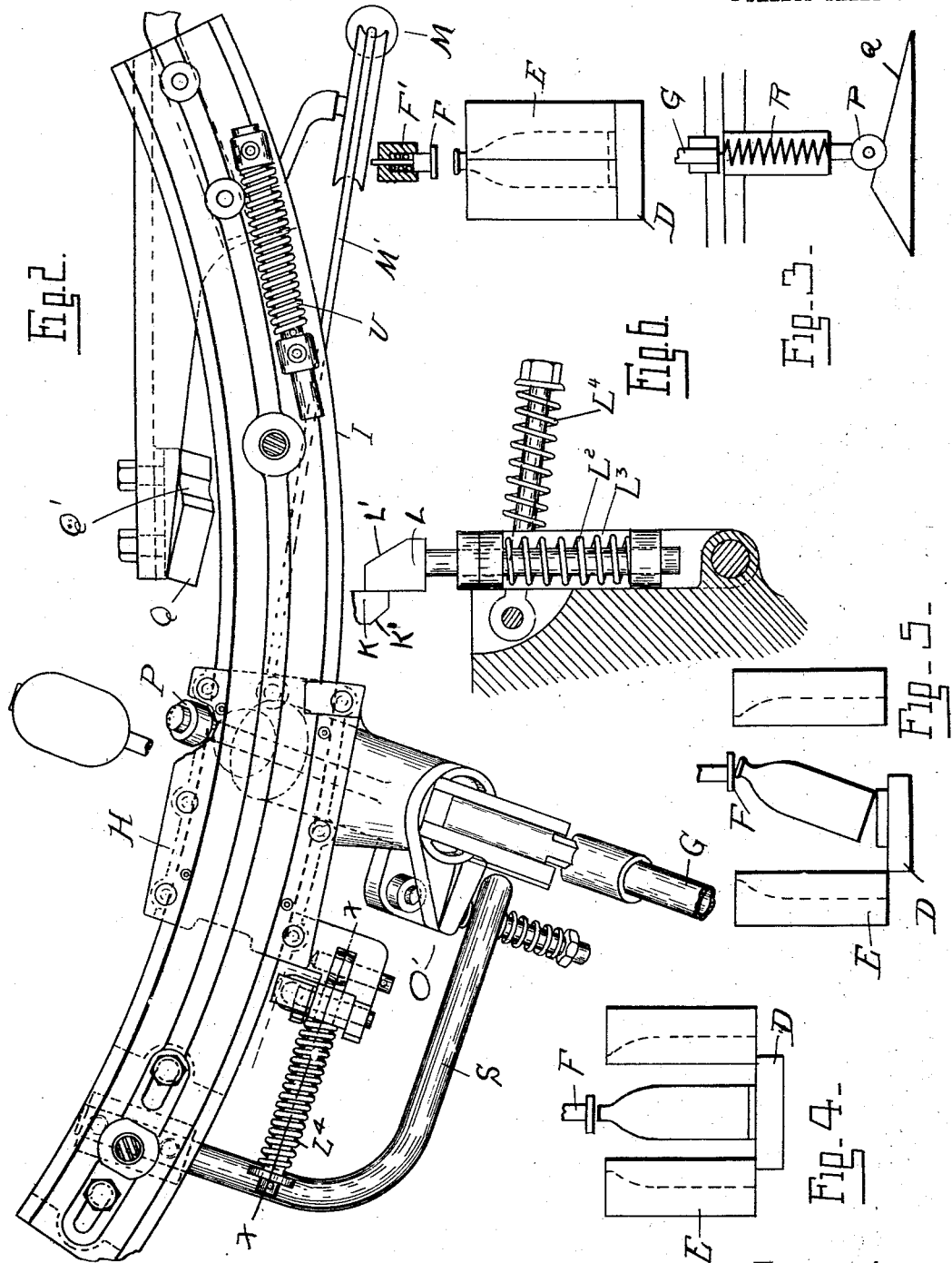

UNITED STATES PATENT OFFICE.

WILLIAM EMIL BOCK, OF TOLEDO, OHIO, ASSIGNOR, BY MESNE ASSIGNMENTS, TO THE TOLEDO GLASS COMPANY, OF TOLEDO, OHIO, A CORPORATION OF OHIO.

GLASS-BLOWING MACHINE.

1,063,108.

Specification of Letters Patent.   Patented May 27, 1913.

Application filed February 25, 1909.   Serial No. 480,016.

*To all whom it may concern:*

Be it known that I, WILLIAM EMIL BOCK, a citizen of the United States of America, residing at Toledo, in the county of Lucas and State of Ohio, have invented certain new and useful Improvements in Glass-Blowing Machines, of which the following is a specification, reference being had therein to the accompanying drawings.

The invention relates to glass blowing machines and has particular reference to the means employed for disengaging the blown article from the finishing molds.

To this end, the invention consists in the peculiar construction as hereinafter set forth.

In the drawings—Figure 1 is a vertical section through a portion of the bottle blowing machine to which my improvement is applied; Fig. 2 is a plan view thereof; Figs. 3, 4 and 5 are diagrammatic views illustrating the sequence of the operation; and Fig. 6 is a section on the line $x$—$x$ of Fig. 2.

In the present state of the art automatic glass blowing machines have been constructed in which the unblown blank is supported by the neck portion during the blowing operation and is fashioned by body molds into which it is blown. The work is disengaged by first separating the neck holding portions and subsequently by the lateral separation of the body molds, permitting the article to drop out. A practical difficulty which has been encountered with machines of this type is the tendency for the article to adhere to one of the sections of the body mold when the latter is open. This results in carrying the article out of registration with the receiving chute before it is disengaged from the mold. Furthermore, the time interval allowed for the disengagement of the article is very short so that a slight delay will throw the machine out of time. The present invention overcomes this difficulty, first, by providing means for holding the blown article during the lateral separation of the body mold sections thereof, and, second, by positively starting the article from its position of support on the bottom mold section by timed mechanism.

The particular construction of glass blowing machine to which my improvement is applied is immaterial to the present invention, and, therefore, the drawing shows only a fragment of the machine at the point where the completely blown article is to be disengaged.

A is a fragment of the mold carrier, which is supported by the roll B upon the cam track C.

D is the bottom section of the finishing mold, and E are the laterally separable body sections which are operated by suitable mechanism (not shown) to disengage the work. The upper ends of these body sections are below the upper end of the finished article, the neck portion of which has been previously engaged by neck molds (not shown).

The improvement comprises essentially a clamping or holding device which engages the upper end of the article prior to the opening of the body molds, and therefore holds it from being carried laterally with either mold section. This clamping means consists of a head F which is held in registration with the upper end of the blown article by a supporting arm G which arm at the proper time is drawn downward to effect the clamping. These parts cannot however be carried permanently in this relation to the molds, as they would interfere with the other parts of the mechanism in the prior operation of the machine. They are, therefore, mounted upon a carriage H, which is adapted for limited travel upon the frame of the machine, and at the time of clamping is coupled to the mold carrier to travel therewith. The carriage H slidably engages a segmental track I which, as shown, is suspended from the frame member J upon which the track C is supported. The coupling connection between the carriage and the mold carrier is formed by a dog K connected to and depending from the frame of the roll B and a coöperating dog or detent L upon the carriage. These parts are so arranged that during the movement of the mold carrier the dog K will be brought into engagement with the dog L, which will move the carriage H along the track I. During this travel, the clamping head F will be in registration with the blown article, and after the clamping operation, and the disengagement of the body mold sections, the carriage H is finally released. This is accomplished by the disengagement of the dogs K and L, which is effected by a raised portion C' on the track C which lifts the roll B and its frame, and raises the dog K above the dog L. When the carriage is released it is returned to its initial position by a counterweight M and a flexible connection M' attached thereto and to the carriage.

For operating the arm G to clamp or release the blown article, said arm is mounted upon a member N, which slidably engages a bearing on the carriage H. The member N slidably engages a sleeve O, which is rockably secured in bearings in the member H and this sleeve at its upper end is provided with a slotted head O' which forms a guide bearing for a laterally-projecting arm N' to which the arm G is secured. The lower end of the member N carries an antifriction roll P which in the initial position of the parts is in engagement with a cam Q on the stationary frame of the machine, which cam holds the parts in a position where the clamping head F is raised above the upper end of the blown article, permitting the latter to come into registration therewith.

R is a spring for drawing downward the arm G when the roll P is disengaged from the cam Q, and F' is a cushion spring for yieldably pressing the head F against the upper end of the blown article.

With the parts as thus far described in operation whenever the dog K comes into engagement with the dog L a blown article in the body mold E is brought into registration with the clamping head F. In the further movement of the mold carrier, the carriage H travels with the mold, and as soon as the roll P is disengaged from the cam Q the spring R draws downward the arm G and head F, thereby clamping the article against its supporting base D. The mold sections E are then opened and in so doing are withdrawn from contact with the blown article, which is held from movement in either direction by the clamping head F. After this is accomplished, the raised portion C' in the track C will disengage the dogs K and L, permitting the counterweight N to return the carriage and in so doing to cause the head F to tip the upper end of the bottle or other blown article and start it toward the receiving chute. As has been stated, the time interval in which this disengaging operation is performed is comparatively slight, and it is therefore necessary that the mechanism should be positive in its operation and accurately timed. It is further desirable to provide safety appliances which in case of the movement of any part out of time will prevent the breaking of the machine, and will further permit of rotating the mold carrier backward as occasionally it is necessary to do. One of the safety appliances which permits the back rotation of the machine is formed by beveling the face of the dogs K and L, as indicated at K' L'. The dog L is also slidably mounted in bearings on the carriage H and is yieldably held in normal position by a spring $L^2$ which, when the carriage is rotated backward, will permit said dog to be depressed, allowing the dog K to pass the same. Another safety appliance is formed by suitably mounting the dog L in a laterally yieldable bearing $L^3$ held in normal position by the spring $L^4$. This spring is of sufficient tension to normally transmit motion from the dog K to the carriage H, but should anything interfere with the movement of said carriage, so as to produce an abnormal stress, then the spring $L^4$ will yield and permit the disengagement of the dogs K and L. A stop arm S is secured to the stationary frame and projects into the path of the rock arm O'. This causes a slight rocking movement of said arm and a consequent lateral movement of the clamping head F in advance of the release of the carriage, which is useful in causing an initial separation of the blown article from the bottom supporting mold sections. There is also a spring buffer U provided for arresting the return movement of the carriage, and to prevent the recoil the cam Q is provided with a notch Q' with which the roll P engages in the normal position of the carriage.

What I claim as my invention is:

1. In a glass blowing machine, the combination with a mold carrier, having laterally-separable body mold sections, of means for holding the blown article from movement during the opening of said body mold sections and for ejecting the article.

2. In a glass blowing machine, the combination with a mold carrier, of a mold thereon, comprising a bottom section and laterally-separable body mold sections, of means independent of the mold for engaging the upper end of the blown article to clamp the same upon said bottom section during the opening of said body mold sections adapted to eject the article.

3. In a glass blowing machine, the combination with a mold carrier and a mold thereon having separable mold sections, of timed mechanism other than the mold for positively separating and ejecting the blown article from said mold.

4. In a glass blowing machine, the combination with a mold carrier and a mold thereon formed in separable sections, of a carriage, a clamping mechanism for the blown article mounted on said carriage, means for coupling said carriage to said mold carrier during a portion of the travel of the latter, and for simultaneously operating said clamping means, for the purpose described.

5. In a glass blowing machine, the combination with a traveling mold carrier, and a mold thereon formed in separable sections, of a carriage, means for coupling said carriage to said mold carrier, to travel with the latter during the separation of the mold sections, mechanism on said carriage for clamping the blown article during the separation of the mold sections, and means for uncoupling and returning said carriage after the opening of said mold sections.

6. In a glass blowing machine, the combination with a mold carrier and a mold thereon formed in separable sections, of a clamping mechanism other than the mold for the blown article, and means controlled by the movement of the carrier for operating said clamping mechanism.

7. In a glass blowing machine, the combination with a mold carrier and a mold thereon formed in separable sections, of means independent of the mold for holding the blown article from movement during the opening of the mold sections controlled by the movement of the carrier.

8. In a glass blowing machine, the combination with a mold carrier, having laterally separable body mold sections, of means independent of the mold for holding the blown article from movement during the opening of said body mold sections, and means for imparting an ejecting movement to said first mentioned means.

9. In a glass blowing machine, the combination with a mold carrier having separable body mold sections, of means independent of the mold for holding the blown article from movement during the opening of said body mold sections movable relative to the carrier, to eject the article.

10. In a glass blowing machine, the combination with a mold carrier, of a mold thereon comprising a bottom section and separable body sections, of means for engaging the upper end of the blown article and yieldably holding the same upon the bottom section during the opening of said body mold sections, said means being adapted to eject the article.

In testimony whereof I affix my signature in presence of two witnesses.

WILLIAM EMIL BOCK.

Witnesses:
MABEL O. MILLER,
T. H. MILLER.